Feb. 24, 1959  P. TARBES  2,875,308
PHOTORESISTIVE CELLS
Filed April 23, 1954  4 Sheets-Sheet 1

Inventor
Pierre Tarbes
By Ralph B. Stewart
attorney

Feb. 24, 1959 P. TARBES 2,875,308
PHOTORESISTIVE CELLS
Filed April 23, 1954 4 Sheets—Sheet 2

Inventor
Pierre Tarbes
By Ralph B. Stewart
Attorney

Feb. 24, 1959  P. TARBES  2,875,308
PHOTORESISTIVE CELLS
Filed April 23, 1954  4 Sheets-Sheet 3

Inventor
Pierre Tarbes
By Ralph B. Stewart
attorney

United States Patent Office 2,875,308
Patented Feb. 24, 1959

2,875,308

PHOTORESISTIVE CELLS

Pierre Tarbes, Paris, France, assignor to Société Nouvelle de l'Outillage R. B. V. et de la Radio-Industrie, Paris, France Application April 23, 1954, Serial No. 425,230

Claims priority, application France April 25, 1953

9 Claims. (Cl. 201—63)

The present invention concerns photoresistive cells and more precisely photoresistive cells the active part of which is made mainly of cadmium sulfide with a very small amount of activators one of which is of the heavy metals group.

It is known that the resistivity of the cadmium sulfide when pure varies with the quantity of light which falls on the layer and that this variation may be increased by a proper thermal treatment and the addition of small amounts of "impurities" acting as activators.

Copper is the most usual of these activators. Very small amounts of impurities may vary the photosensitivity since the concentration of the activators is never more than one part per thousand. It is therefore necessary that, once the photoresistive material has been carefully prepared, no extra impurity of any kind should be allowed to get into it. It is therefore one object of the invention to provide means that will protect the photoresistive layer against any atmospheric or chemical reagent.

The use of the photoresistive properties of cadmium sulfide to the measure of light levels is well known. It is usual practice to place the photoresistive layer made of small activated crystals on a support (generally glass) and to have at least two or more electrodes in electrical contact with the layer but insulated one from the other. These electrodes are connected to a voltage source and the current which flows in said circuit is a measure of the resistivity of the layer that is to say of the light level falling on said layer. The invention is related to cadmium sulfide photoresistive cells comprising at least two large area electrodes as a contrast to the type of cell described in U. S. Patent 2,582,850 to A. Rose. The type of cell which is concerned with the present invention has been described in Glass und Hochvacuum Tecknik 1952 issue No. 8 page 145.

Owing to the fact that the dark resistivity is high but not infinite, a photoresistive cell shows always a small dark current. It is another object of the invention to provide means whereby such current is maintained as low as possible by increasing the leakage resistor between the electrodes. The sensitivity of the cell is determined by the chemical and physical nature of the layer. However, to detect the small current variations produced by a small resistivity variation, it is necessary to eliminate from the cell circuit any spurious fluctuating resistor It is still another object of the invention to provide means whereby the electrical continuity of the cell circuit is insured.

It is still another object of the invention to provide means whereby the cell envelope is made tight by means of a few mass production processes. It is still another object of the invention to provide means whereby the photosensitivity of the cells is made equal or uniform in a mass production.

Still another drawback of the photosensitive cells of the prior art is due to the fluctuations of the dark curent owing usually to the lack of homogeneity in the photosensitive layer and to the evolution of said layer during the life time of the cell. It is still another object of the invention to provide for cells in which the dark current is stabilized by providing means to prevent any chemical or physical modification in the layer and by supplying a low resistance path between the electrodes and the external leads.

According to the invention the photoresistive cell comprises an activated cadmium sulfide layer, a chemically inert support the under face of which shows one or many ribs and hollows, at least two electrodes which rest on said layer, the side of the support and underneath it, and a plastic casing made at most of two parts, one of said parts including a totally or partially transparent window, and at least a protective coating on said photosensitive layer, and at least two external leads.

According to another feature of the invention, the casing is made of one piece sealed to the external leads by a coating process.

According to another feature of the invention between said protective layer and said casing window lies a filter, the absorption of which varies from one cell to another.

The invention will be better understood by reference to the following description and drawings in which.

Figure 1:
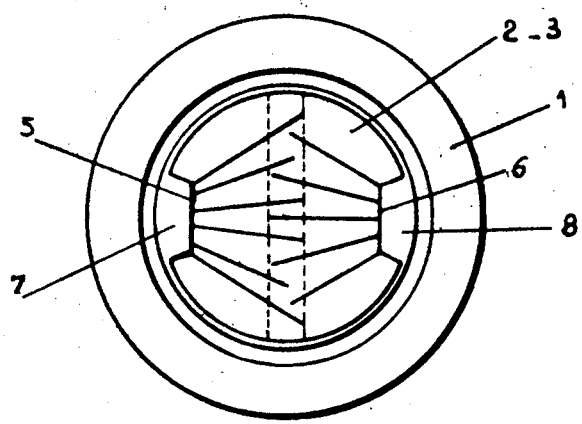
Figures 1 and 2 show a front and sectional view of one cell according to the invention.
Figure 2:
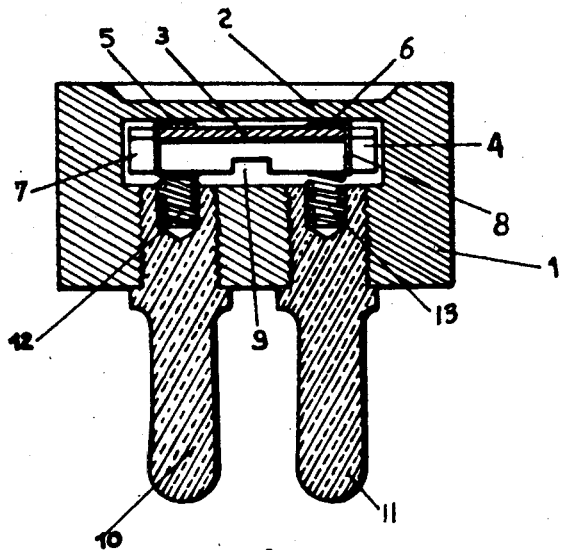

Figure 1 shows a front view of a round cell, though this shape should not be considered as necessary. The casing 1 is of molded plastic which is made non transparent to the light by nature or by means of an external painting as is the case for cell of Figures 1 and 2, though said painting is not shown. A dark brown or black painting is used. The upper part of the casing shows a circular hole in which is cast the window 2 transparent or slightly absorbent with respect to the incoming light which falls on the photoresistive cadmium sulfide layer 3 placed under the window 2 on the support 4. The layer is obtained by vacuum evaporation of CdS, though it may also be obtained by painting or spraying.

Two electrodes 5 and 6 lay on the sensitive layer. They are obtained by the same process as the layer itself. As shown on Figure 2, the conducting electrodes are continued on the thickness of the support 4 and on its lower face where springs 12 and 13 press against them. These springs are located in sockets made for this purpose in the upper part of external leads 10 and 11. The threaded upper parts of said leads cooperate with threaded holes in the casing. As appears on Figure 1 support 4 shows two recesses 7 and 8 which are intended to shorten the conductive path between the electrodes and the external leads. The use of springs 12 and 13 insures a good electrical continuity of said path even if the cell is subject to vibrations or local heating of some parts with respect to the others. The lower face of the support 4 shows a reentrant shape obtained by machining a groove 9 in said structure.

This groove is perpendicular to the recesses 7 and 8, it is intended to lengthen the leakage path between the two leads on the lower face of support 4. Owing to the resistivity of the support 4 it may be necessary to provide many such grooves, and to fill the intermediate grooves with a better insulator than the support itself.

As was said, it is necessary that the chemical composition of the layer 3 should be kept from any pollution.

Figure 4:
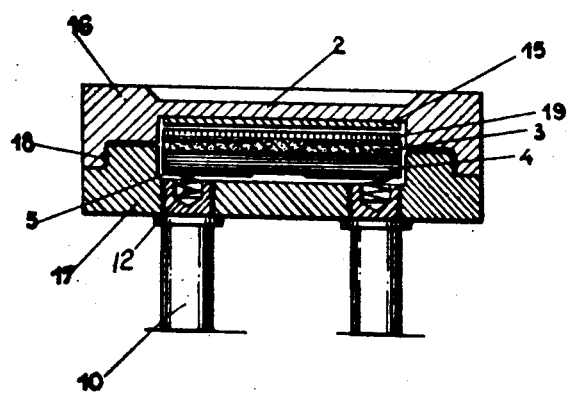

The proper materials for support 4 which are the most suitable are the following: porcelain and ceramics such as the steatite and the refractory oxydes such as alumina, silicon oxyde amorphous or crystalline (sapphire), zircona, and beryllium oxyde. The use of the oxydes is often preferred because it is surest since the chemical composition of the support is known with precision. The support may be manufactured from pure oxide by the cell manufacturer, for instance by sintering. Another way of obtaining the proper shape of the support with little machining is to use a metal plate, the surface of which is oxydised after machining. This is readily done with aluminum by any known process such as anodic oxydising. It is necessary afterwards to dry carefully the oxyde layer. Then the cadmium sulfide is vacuum evaporated on the support and the activation process is carried on by the ordinary way. As was said, it is necessary to protect the photosensitive layer against any deterioration or poisoning. Therefore a protective layer appearing at 19 on Figure 4 is provided on the layer as will be explained later.

When the plastic material which constitutes the external casing is not transparent to the incoming light, window 2 is cast in a hole of plastic casing. When it is transparent, as ethoxilin resins or polyvinilic products, the window 2 consists merely of thin plate of the casing material and the whole casing may be one piece, as shown on Figure 8.

Figure 3:
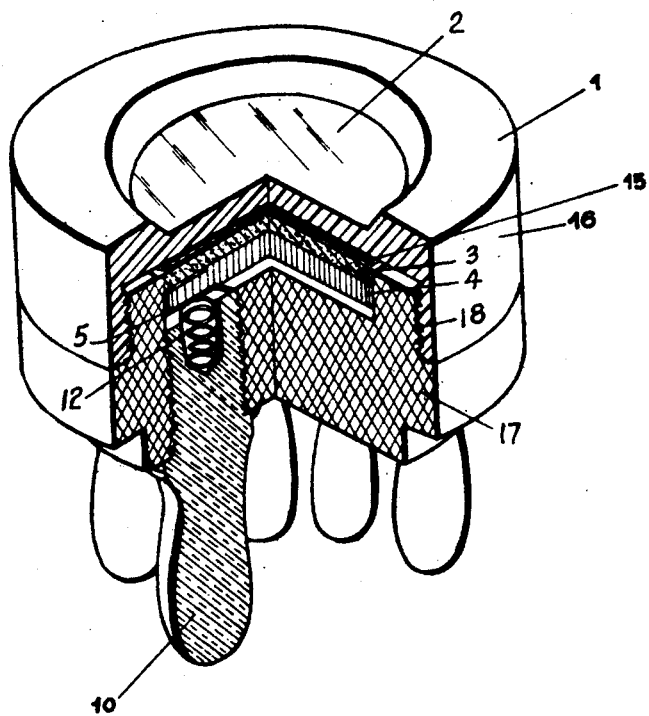
Figures 3 and 4 show an outside view partly cut and a sectional view of another cell embodying the invention.

Figure 3 shows a cell according to the invention in which the casing is made of two parts 16 and 17 which are connected together by means of the threaded engagement 18. This engagement is not enough to protect the layer against any atmospheric agent such as moisture for instance. It is necessary to put glue or varnish along the border line between the two parts of the casing. The casing is usually made of Plexiglas, and such a glue is founnd commercially. When using polyvinylic plastics it is preferred to seal the two parts of the casing by local heating. Parts 16 and 17 are molded plastic parts. The upper part shows a recessed wall 2 which constitutes the window in front of the sensitive layer 3. The lower part 17 is bulky and shows a socket for the support 4 of the layer and threaded holes for the external leads such as 10. As shown there are several leads, more than one lead being in contact with each electrode so as to decrease the resistance of the conductive path of the cell. The casing is made air tight and moisture proof by means of a lacquer or a varnish around the threaded parts. Between the window 2 and the sensitive layer 3, a filter 15 is provided, the transmission coefficient of which may differ from one cell to another. The use of said filter makes it possible to provide cells which have the same characteristic, that is the same dark current and the same "current versus light" curve. Indeed as was stated above, the photoelectric properties of the cadmium sulfide are preset by very small quantities of activators added to the base material and it is not always possible to manufacture a large quantity of identical cells. The layers are tested after the activating process, and the transparency of the filter is chosen according to the result of the test so as to compensate for the discrepancies which may occur. Such a filter consists in a cellulosic sheet such as "cellophane" which is dyed. The operator is provided with several different grade filters and chooses the one which matches the actual cell. It is possible to reach the same effect by using a filtering protective layer 19 (Figure 4). Protecting layer 19 consists in a thin film of varnish containing the product known under the trademark "Silicone" in a suitable solvent. The Silicone will harden at room temperature and leave on the sensitive layer a transparent waterproof film. The dye is added to the liquid Silicone varnish.

Figures 5, 6:
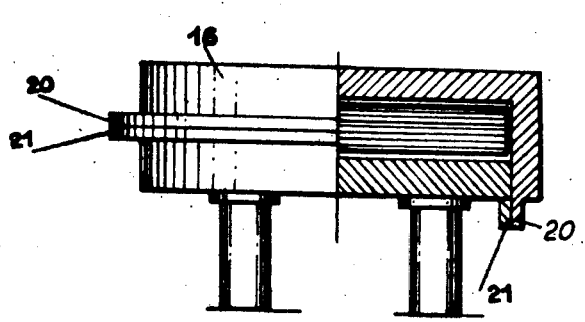
Figures 5 and 6 show two outside views of another embodiment of the casing of the cell.

Figures 5 and 6 show another shape of casing made of two parts. Both parts are molded from polystyrol plastic or another low temperature melting plastic with lateral flanges, respectively shown as 20 and 21. After mounting, the casing is sealed by local flame heating of the cooperating flanges along the border line between the two parts 16 and 17.

Polystyrol plastic shows good insulating properties together with good optical transparency. The window 2 is the front face of the upper part of the casing; the other sides of said casing are painted with a dark brown paint to suppress any lateral illumination of the sensitive layer.

Figure 7:
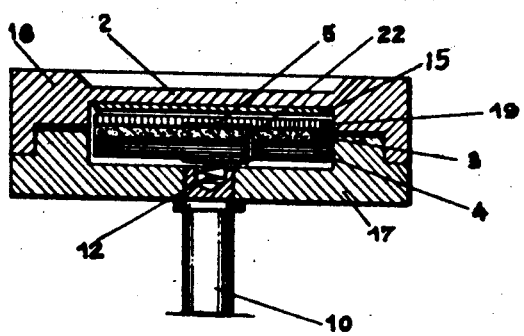
Figure 7 is a cell of the type shown on Figures 3 and 4 in which the connection between the electrodes and the external lead is differently made.

It is sometimes important that the mechanical strength of the cell should be as high as possible. In this case, the use of several peripherical leads is not the best solution and it is preferred to use the cell shown on Figure 7 which presents central leads or pins one of which only is visible as 10. According to the invention, the contact between the electrodes such as 5 and the pins such as 10 is provided by means of a throughout conductor, such as 22, which extends in a hole provided in the support 4 so as to establish a conductive path between the electrode and the lower face of the support which bears a conductive coating. Spring 12 presses against said coating as said before.

Figure 8:
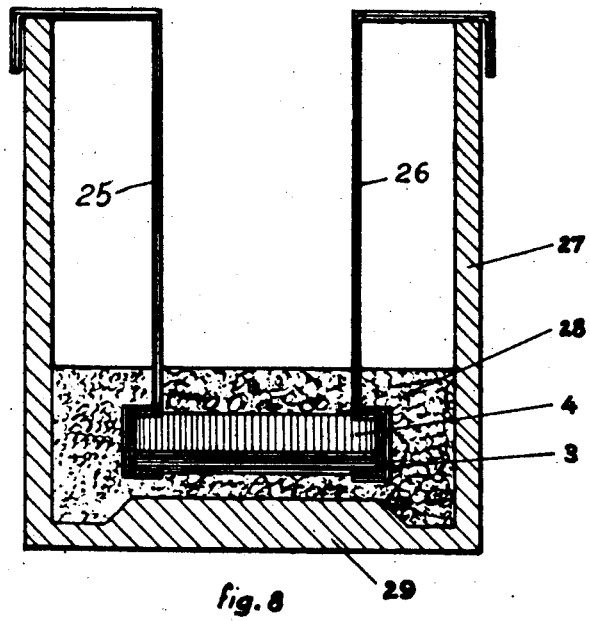
Figures 8 and 9 show another embodiment of the invention in which the casing is made of one piece by a coating process.
Figure 9:
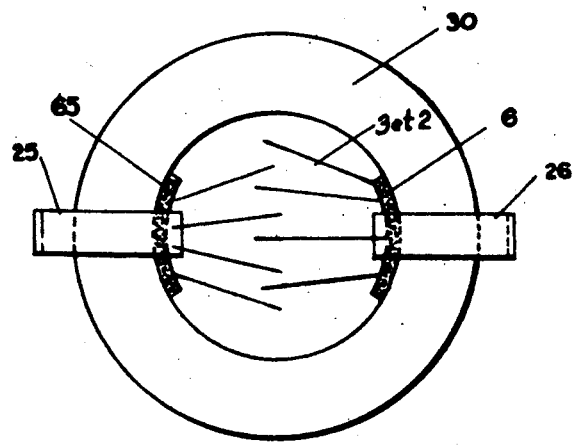

Figures 8 and 9 relate to an embodiment of the cell which is most suitable when mass production is to be achieved. The different parts of the cells are as said before. The casing is a one piece transparent plastic casing to which the pins are sealed during the one dipping operation which produces the casing. As shown on Figure 8, the inside assembly made of the sensitive layer 3, its support 4, the electrodes, the protective layer 19, the filter 15 when used, are clamped together by means of leads 25 and 26 made of beryllium bronze. The clamping is obtained by using the elastic forces developed in the lead between the two successive 90° bends at the lower part of each lead. The upper part of the lead shows also a double 90° bend which makes it possible to use the leads to suspend the whole assembly in a vessel 27, at the right distance from the bottom 29 of said vessel. As shown, the bottom of the vessel is profiled so as to be thicker near the center of it. A liquid or a power 28 is poured in the vessel up to the correct height. The vessel is heated to the correct temperature to obtain hardening of 28. The vessel 27 acts as a mold for the casing 30 of the cell. The profile of the bottom provides for the thin flat window 2. This process gives good results with metacrylate powder of the "Plexiglas" type. When the hardening is over, the complete cell, as shown on Figure 9, is taken from vessel 27.

The same process may be carried on with any kind of Araldite, but owing to the fact that this kind of plastic is not sufficiently impervious to moisture, this solution should usually be disregarded. Nylon powder may also be used. The process is more complicated because pressure should be applied to the powder during the polymerisation process. It is necessary to provide a plunger to apply said pressure on the top of the powder.

The cells manufactured according to this process are completely air tight and the whole operation may be carried on with little man power. The leads are then put straight again and the cell is ready for use.

What I claim is:

1. A photoelectric cell comprising, a rigid support of insulating material, a layer of photoresistive material carried by the top face of said support, at least two conductive electrodes connected to said layer at spaced points and having conducting leads extending to the under face of said support, a transparent protective layer comprising a coating of varnish on the top surface of said photoresistive layer, and an air-tight casing enclosing said support and the elements mounted thereon, at least a portion of said casing, including the top wall thereof, being formed of transparent plastic material and having a thin window section therein opposite said photoresistive layer and being integral with a thicker rim section.

2. A photoelectric cell according to claim 1, wherein said layer of photoresistive material is formed of small crystals of cadmium sulfide and said support is formed of ceramic material.

3. A photoelectric cell according to claim 1, wherein the under face of said rigid support is formed with a grooved surface to increase the length of the leakage path between said conducting leads.

4. A photoelectric cell according to claim 1 and including a sheet of filter material interposed between said protective layer and the window of said casing.

5. A photoelectric cell according to claim 1, wherein said casing is formed of two molded plastic parts provided with abutting flanges which are bonded together at their outer edges.

6. A photoelectric cell according to claim 1, wherein said air-tight casing comprises a solid plastic casing molded in contact with said support and the elements mounted thereon.

7. A photoelectric cell according to claim 1, wherein said rigid support is formed of a refractory oxide.

8. A photoelectric cell according to claim 1 and including elastic conductive members mounted behind said rigid support and interposed between the wall of said casing and said conductive leads on the under face of said support and pressing said support toward the window of said casing.

9. A photoelectric cell comprising, a block of insulating material, a layer of photoresistive material carried by one face of said block, at least two conductive electrodes connected to said layer at spaced points thereon and having conducting leads extending to the rear face of said block, an air-tight casing enclosing said block and the elements mounted thereon, said casing having a transparent window-portion, and said photoresistive layer being positioned in front of said window, a pair of metallic connector pins extending through the wall of said casing in the rear of said block and having their inner ends terminating adjacent said conducting leads, said pins being supported from said wall by screw-threads on portions thereof passing through said wall and engaging mating threads formed in said wall, said pins having sockets formed in their inner ends facing said conducting leads, and spring elements mounted in said sockets and pressing against said conducting leads.

References Cited in the file of this patent

UNITED STATES PATENTS

| | | |
|---|---|---|
| 1,948,766 | Lyon | Feb. 27, 1934 |
| 2,036,457 | Calsow | Apr. 7, 1936 |
| 2,084,866 | Plimpton | June 22, 1937 |
| 2,114,591 | Clark | Apr. 19, 1938 |
| 2,162,288 | Taylor | June 13, 1939 |
| 2,181,494 | Nix | Nov. 28, 1939 |
| 2,330,652 | Wiegand | Sept. 28, 1943 |
| 2,375,058 | Wiegand | May 1, 1945 |
| 2,383,951 | Bass | Sept. 4, 1945 |
| 2,544,554 | Holmes | Mar. 6, 1951 |
| 2,582,850 | Rose | Jan. 15, 1952 |
| 2,586,609 | Burke | Feb. 19, 1952 |
| 2,651,700 | Gans | Sept. 8, 1953 |
| 2,668,867 | Ekstein | Feb. 9, 1954 |
| 2,674,700 | Small | Apr. 6, 1954 |
| 2,728,062 | Klostermann | Dec. 20, 1955 |
| 2,742,550 | Jenness | Apr. 17, 1956 |